Sept. 23, 1969  H. GÖTT ET AL  3,469,055
CONTACT MATRIX FOR A WIRE MESH WELDING MACHINE
Filed Jan. 24, 1967  2 Sheets-Sheet 1

INVENTORS:
Hans Gött and
Josef Ritter,

BY

THEIR ATTORNEY.

INVENTORS:
Hans Gött and
Josef Ritter.

BY *[signature]*

THEIR ATTORNEY.

3,469,055
CONTACT MATRIX FOR A WIRE MESH
WELDING MACHINE
Hans Gött, Graz, and Josef Ritter, Graz-Kroisbach, Austria, assignors to EVG Entwicklungs- und Verwertungsgesellschaft m.b.H., Graz, Austria
Filed Jan. 24, 1967, Ser. No. 611,408
Claims priority, application Austria, Feb. 4, 1966,
A 1,049/66
Int. Cl. B23k 11/10
U.S. Cl. 219—56                                    7 Claims

ABSTRACT OF THE DISCLOSURE

Interchangeable contact matrices have differently arranged conducting and insulation portions to provide different wire spacing in a wire mesh making machine.

This invention relates generally to wire mesh making machines and more particularly to means adapting a wire mesh machine to produce mesh with different wire spacings.

In modern wire mesh welding machines use for manufacturing welded wire mesh from longitudinal and transverse wires by electrically welding them together at their crossing points there are bus bars for conducting the electric current to and from the welding points.

In known machines of this kind the bus bars are situated underneath electrodes and form contact surfaces at equal heights on opposite sides, so that the electrodes either rest directly on the bus bars or are held in individual electrode holders which rest on the bus bars. Each electrode, or electrode holder, is in the form of a rider, one of the legs of the rider resting in contact with one of the bus bars, for example with the positive bus bar, and the other leg of the rider being insulated from the other bus bar, namely the negative bus bar, by means of an insulating foot. With this arrangement each electrode can be changed over, to contact the other bus bar, simply by rotating it through 180°. For the process of double point welding the electrical circuit is completed by current bridges which rest in position above the electrodes on the other side of the wires which require welding.

The wires which will be welded together to form the mesh are fed through between the electrodes and the current bridges. As soon as the crossing places between the transverse wire and the longitudinal wires come between the electrodes and the current bridges the bridges are pushed down to hold the wires between the electrodes and the bridges and the welding current is switched on. The electric current flows through each double point welding circuit from the positive electrode through the contact place between the longitudinal and the transverse wire and so through the current bridge and through the contact place between the transverse wire and the next longitudinal wire and finally to the negative electrode.

Wire mesh welding machines are however used only seldom for manufacturing exclusively a single type of mesh. Usually a welding machine is used for making a large number of different types of mesh which differ from each other not only with regard to the wire thickness but also in that the wires are spaced differently longitudinally and transversely. However, these different spacings are not often entirely arbitrary. The machine is usually required to provide a basic spacing and any desired multiple of this basic spacing.

In the case of a machine in which it is desired to change the wire spacing arbitrarily the electrodes must be mounted adjustably on the bus bars so that they can be pushed along on the bus bars and then fixed in position to give the desired spacing. On the other hand, in the case of a machine in which it is desired only to change the spacing from a standard basic spacing to simple multiples of this spacing it is not necessary to mount the electrodes so that they can be shifted along the bus bars; it is merely necessary to arrange that particular electrodes can be pole-reversed. For example if it is desired to change from the smallest spacing between longitudinal wires, say $a$ mm., to the next greater multiple of this spacing, for instance $2a$ mm., each second electrode is pole-reversed. To effect this pole-reversal a number of operations must be performed on each of these electrodes. First of all the clamping bolt must be loosened or removed, then the electrode, which is in the form of a rider, must be lifted off the bus bar and turned around so that the surface of the electrode which up to then had made contact with, for example, the bus bar on the output side of the machine, is brought into contact with the bus bar on the input side of the machine, and the insulated leg of the rider electrode is changed from the bus bar on the input side of the machine to that on the output side, thereby reversing the polarity of the electrode.

Because of this changing of position of the electrode the clamping bolt takes up a new position on the other side of the machine and the operator must walk around the machine to tighten it up again. This process must be repeated for each individual electrode which has to be pole-reversed and it is obvious that a considerable amount of time is required for completing the changeover.

In order to reduce the total changeover time, electrodes have been designed so that each electrode can be used either only for connection to the positive bus bar or only for connection to the negative bus bar, and in this case the clamping bolts are all on the same side of the machine. However, in this case, electrodes which have to be pole-reversed still have to be exchanged, but at least the whole changeover operation can be performed from the same side of the machine and this can be arranged to be from the output side which is the more accessible.

According to this invention a machine for manufacturing wire mesh by welding longitudinal wires to transverse wires comprises two bus bars extending across the machine, electrodes arranged on the bus bars, and current bridges arranged above the electrodes, the bus bars each having a contact face on one side and each electrode being electrically connected to one or the other of the two bus bars through a contact matrix which is held against the contact faces of the bus bars and which contains electrically insulating and conducting parts arranged in such a way that the electrodes are connected to either one or the other of the bus bars as required for the machine to manufacture wire mesh with a particular longitudinal wire spacing, the contact matrix being removable so that it may be replaced by a matrix in which the conducting and insulating parts are arranged differently to adapt the machine to manufacture wire mesh with a different longitudinal wire spacing.

In this way the changeover may be carried out both simply and quickly.

Preferably each bus bar has its contact face on the output side of the machine and the contact matrix extends across the entire width of the machine, although it may be made up from a number of sections each of which extends across only part of the width.

The electrodes may be fixed and arranged in a row with a standard basic spacing between adjacent electrodes, there being one contact matrix for this basic spacing, and one contact matrix for each desired harmonic of this basic spacing.

Instead of arranging the contact matrix to function merely as a contact device between the bus bars and the electrodes, the contact matrix may have permanently mounted on it clamping pieces to hold the electrodes, to the effect that when the machine is changed over to a new wire spacing the contact matrix is replaced complete with the clamping pieces. Also the electrodes themselves may be permanently mounted in the clamping pieces.

In a further version of the invention each of the contact matrixes may have mounted on it a complete set of electrode holders containing electrodes, so that the entire electrode system or if desired a particular part of the row of electrodes can be changed to give a different longitudinal wire spacing merely by exchanging the contact matrix.

An example of a machine in accordance with the present invention will now be described with reference to the accompanying drawings, in which.

Figure 4:
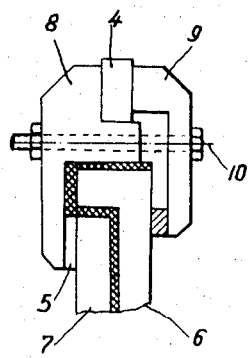
FIGURE 4 is a diagrammatical cross-section through part of the machine taken on the line 4—4 of FIGURE 1.
Figure 5:
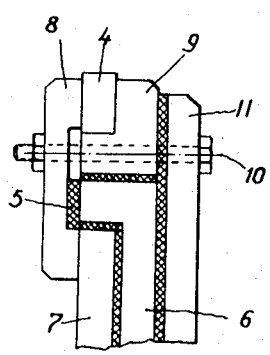
Figure 5A:
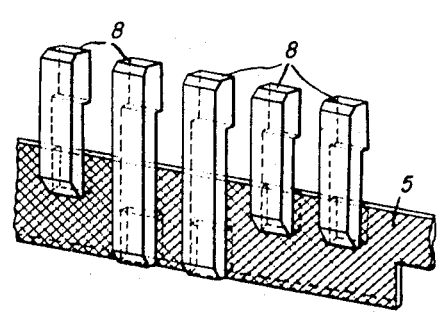
Figure 6:
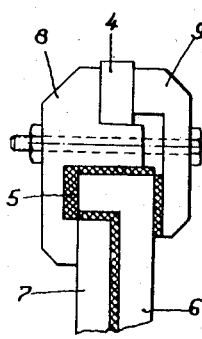
Figure 6A:
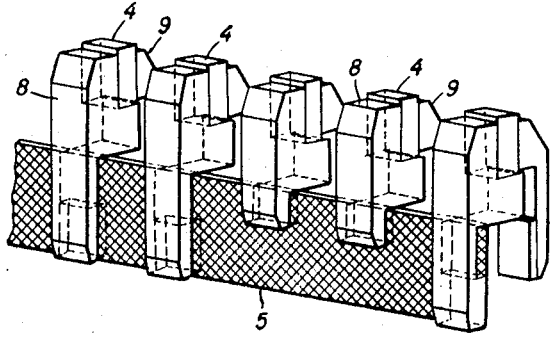

FIGURES 5 and 6 are similar views to that shown in FIGURE 4, but of modified versions of the invention; and FIGURES 5a and 6a are perspective views of the contact matrixes used in the modifications shown in FIGURES 5 and 6 respectively, with parts attached to these contact matrixes.

Figure 1:
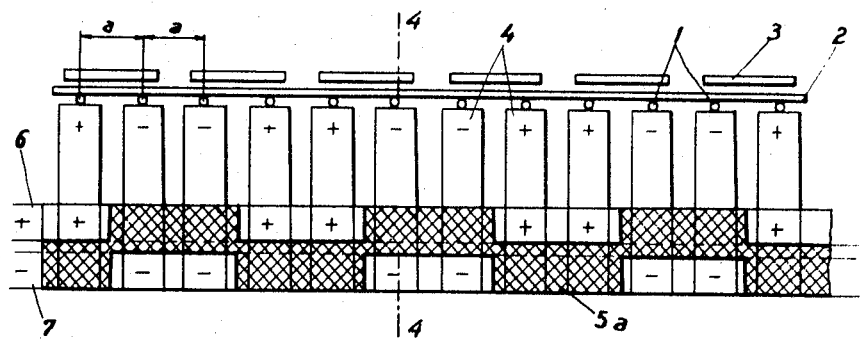
FIGURE 1 is a diagrammatical cross-section through part of the machine showing a contact matrix which adapts the machine for welding wire mesh with a regular basic spacing of the longitudinal wires.

FIGURE 1 shows a transverse wire 2 running across longitudinal wires 1, between passive current bridges 3 and active electrodes 4. The distance between the axes of two neighboring longitudinal wires is $a$ mm. Inserted between two bus bars 6 and 7, which are represented in the figure by thin lines and are assumed to be lifted off, and the electrodes 4 there is a contact matrix 5a. The contact matrix 5a is in the form of a plate lying in the plane of the drawing, and lies flush with the bus bars 6, 7 on one side and with the electrodes 4 on the other side. Of the two bus bars 6 and 7 the positive bus bar is in the upper position and the negative bus bar is in the lower. The two bus bars 6, 7 are separated by an insulating strip and extend right across the machine having their contact surface situated in a common vertical plane. The contact matrix contains conductive regions, represented in the drawing by "+" and "—" signs, and insulating regions which are shown hatched. In FIGURE 1 the conductive and the insulating regions of the contact matrix 5a are so distributed that the machine is arranged to weld wire mesh with the longitudinal wire spacing of $a$ mm.

In each of successive pairs of electrodes, one electrode is in contact with the positive bus bar 6 and the other electrode is in contact with the negative bus bar 7, and the two are connected through the wires and a current bridge 3.

Figure 2:
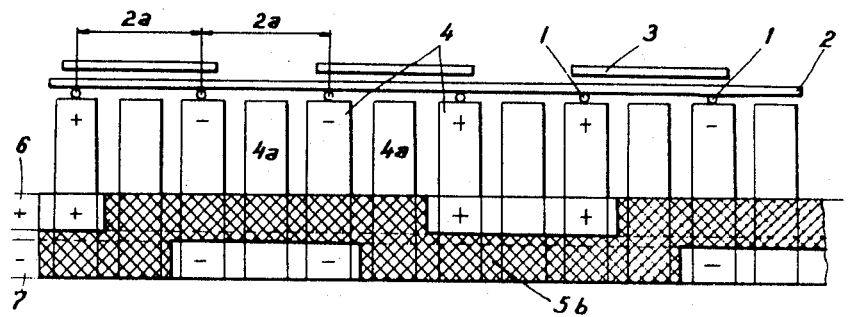
FIGURE 2 is a similar view to that shown in FIGURE 1 but showing a contact matrix which adapts the machine for welding wire mesh with a longitudinal wire spacing double that given by the matrix shown in FIGURE 1.

When it is desired to adapt the machine to weld wire mesh with a longitudinal wire spacing of $2a$ mm., all that is necessary is to remove the contact matrix 5a of FIGURE 1 and replace it by the contact matrix 5b shown in FIGURE 2. The effect of this change is that all the electrodes 4 are now circuited differently and give the new longitudinal wire spacing $2a$. The electrodes 4a in FIGURE 2 are now inoperative, and longer curve bridges 3 are necessary.

Figure 3:
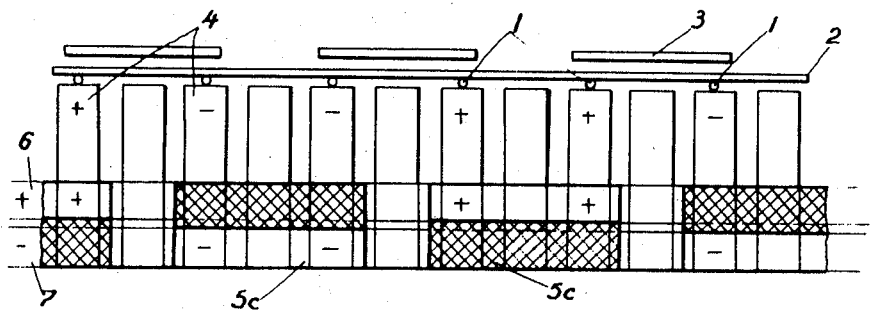
FIGURE 3 is a similar view to that shown in FIGURE 2 but in which the contact matrix is in separate pieces instead of one long strip.

FIGURE 3 shows the machine with a contact matrix made up from a number of separate parts 5c which are arranged to achieve the same effect as the contact matrix 5b in FIGURE 2.

Figure 4A:
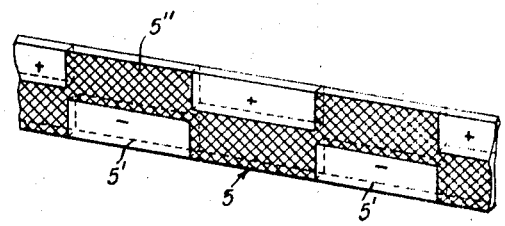
FIGURE 4a is a perspective view of part of the contact matrix shown in the machine in FIGURE 1.

FIGURE 4 shows the two bus bars 6, 7 situated underneath an electrode contact 4, so that the bus bars serve to support the electrodes. The contact 4 is held by the electrode clamping parts 8 and 9 by means of a bolt 10, and the whole electrode assembly is mounted on the bus bars 6 and 7. The clamping part 9 is insulated against the bus bar 6, whereas the clamping part 8 acts as a connector, since between the clamp 8 and the coplanar contact surfaces of the bus bars is the plate contact matrix 5. This contact matrix 5 is shown in FIGURE 4a in perspective and consists of contacting portions 5' and an insulating portion 5". In order to change the machine over to accommodate a different longitudinal wire spacing, the bolt 10 is first loosened and then the contact matrix 5 is removed and replaced by a different one.

FIGURE 5 shows a modification of part of the machine. In this case the contact 4 is held by clamping parts 8, 9 and 11, by means of a bolt 10. The clamping parts 8 are of different lengths (as shown in FIGURE 5a) and the foot of each clamping part 8 makes contact with one or the other bus bar as required. Where a clamping part 8 bridges across a bus bar without making electrical contact with it there is interposed an insulating plate which is analogous to an insulating region of the contact matrixes of FIGURES 1 and 2. The insulating plate is part of a supporting structure which supports all the clamping pieces 8. In order to change the machine over to accommodate a different longitudinal wire spacing, the bolt 10 is first loosened and then the assembly of clamping pieces 8, held together by the insulating plate which supports them all rigidly in the correct position, equivalent to a contact matrix with clamping pieces 8 attached to the conducting regions is removed and replaced by a different support and clamping piece assembly to give the new longitudinal wire spacing.

FIGURE 6 shows a further modification. In the previously described versions, represented in FIGURES 1 to 3, it is possible only to adapt the machine to accommodate longitudinal wire spacing of a basic value or harmonics of this value. In the modification shown in FIGURE 6, the electrode contacts 4, with their electrode clamping pieces 8, 9, are attached to the matrix 5 and as such, together form a unit which can be replaced in the machine by another unit of similar construction but giving a different wire spacing. The electrical connections are made as shown in FIGURE 5. The arrangement shown in FIGURE 6 allows the machine to be changed over a rapid and simple manipulation from any wire spacing to any other desired wire spacing, whereby the alternative wire spacings need not be harmonics of each other.

Another advantage of the machine in accordance with the present invention is that the contact surfaces of the bus bars 6 and 7 are always fully covered and thus protected from dirt; an advantage of considerable importance.

We claim:
1. A machine for the production of welded mesh wire comprising, in combination:
   (a) a positive and a negative bus bar extending across said machine, said bus bars having contact surfaces oriented in the same direction;
   (b) a plurality of electrodes located between said bus bars and the plane of the wire mesh;
   (c) a plurality of passive current bridges positioned above the plane of the wire mesh; and
   (d) a contact matrix positioned removably between said electrodes and the contact surface of said bus bars, said matrix being composed of conducting areas and insulating areas arranged in a checkerboard like pattern extending over at least part of the width of said machine.

2. A machine as claimed in claim 1 wherein said conducting areas and said insulating areas of said contact device are arranged in a pattern to produce a harmonic of basic wire spacing.

3. A machine as claimed in claim 1 including clamping means of high electric conductivity for clamping said electrodes to said conducting areas of said contact device.

4. A machine as claimed in claim 1 wherein said electrodes are fixedly attached to said conducting areas of said contact device.

5. A machine as claimed in claim 1 wherein said contact device is comprised of an insulating carrier and a plurality of conductive inserts fixedly attached to said carrier.

6. A machine as claimed in claim 5 wherein said insulating carrier is in the form of a frame circumferentially enclosing said conductive inserts.

7. A machine as claimed in claim 5 wherein said carrier is in the form of a flat plate comprised of insulating areas and conductive areas and wherein said contacting surfaces of said bus bars are arranged in a common plane, said insulating areas and said conducting areas being interchangeably attached to said contact surfaces of said bus bars.

References Cited

UNITED STATES PATENTS 3,125,668   3/1964   Eisenburger et al. ___ 219—56 X

JOSEPH V. TRUHE, Primary Examiner

B. A. STEIN, Assistant Examiner

U.S. Cl. X.R.

219—88